Figure 1:
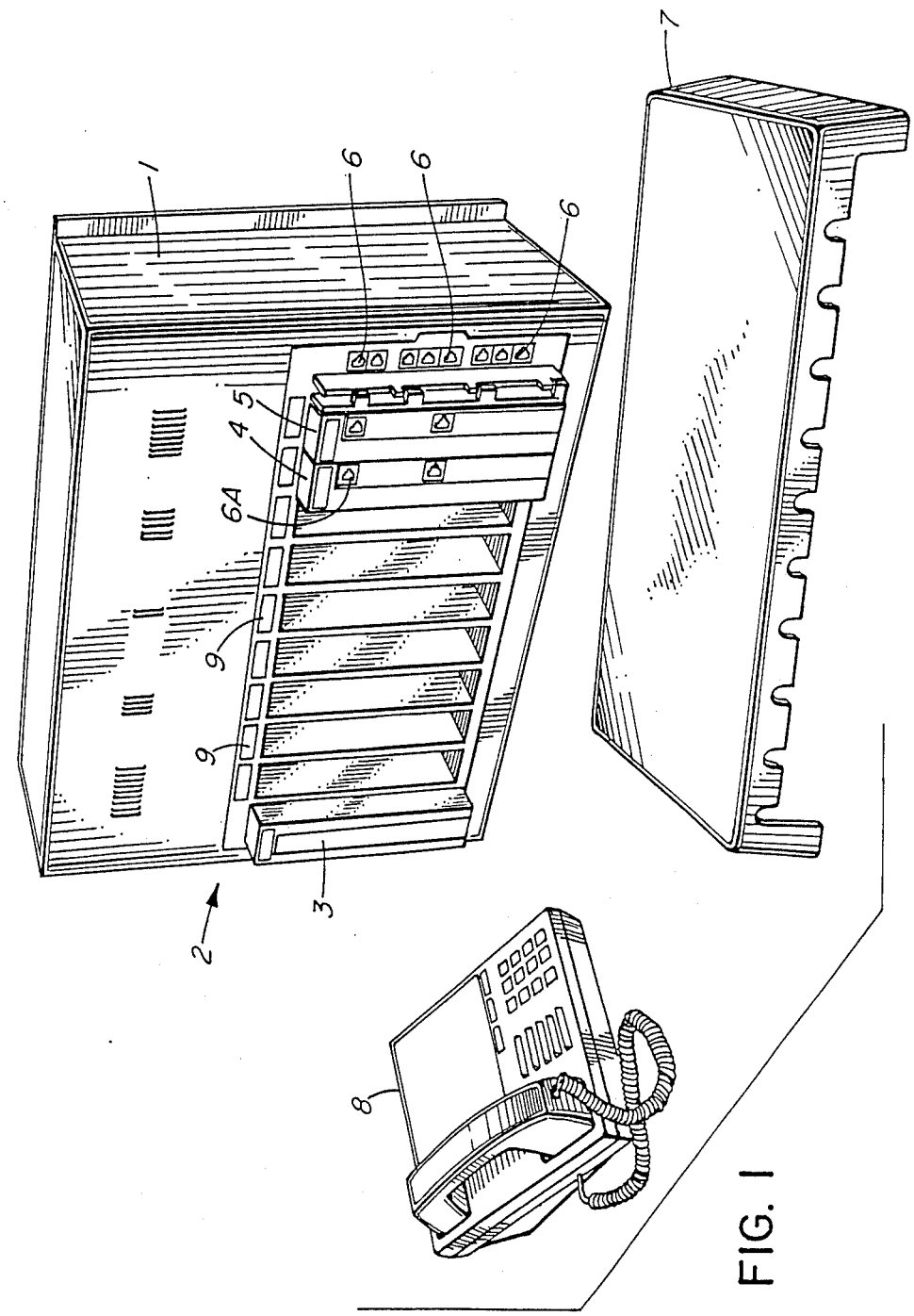

United States Patent [19]

Molnar

[11] Patent Number: 4,736,406
[45] Date of Patent: Apr. 5, 1988

[54] EXPANSION SUBSYSTEM FOR USE IN A COMMUNICATION SYSTEM

[75] Inventor: Gerald Molnar, Ottawa, Canada

[73] Assignee: Trillium Telephone Systems Inc., Canada

[21] Appl. No.: 928,056

[22] Filed: Nov. 7, 1986

[30] Foreign Application Priority Data

May 12, 1986 [CA] Canada ............................ 508858

[51] Int. Cl.⁴ .................................. H04M 11/00
[52] U.S. Cl. .......................... 379/94; 379/157; 379/165; 379/201; 379/269
[58] Field of Search .......... 379/94, 157, 164, 165, 379/166, 201, 269, 93, 156, 158, 159, 167, 203, 204, 268, 325–332

[56] References Cited

U.S. PATENT DOCUMENTS

| | | | |
|---|---|---|---|
| 3,758,729 | 9/1973 | Everhart | 379/164 X |
| 3,940,568 | 2/1976 | Rutkowski et al. | 379/269 X |
| 4,113,985 | 9/1978 | Day | 379/157 X |
| 4,144,415 | 3/1979 | Saxon | 379/157 |
| 4,338,495 | 7/1982 | Bloch et al. | 379/157 X |
| 4,440,986 | 4/1984 | Thorson | 379/94 X |
| 4,506,346 | 3/1985 | Bennett et al. | 379/166 X |
| 4,627,046 | 12/1986 | Bellamy | 379/284 X |
| 4,686,330 | 8/1987 | Hourton | 379/269 |
| 4,694,452 | 9/1987 | Beckinger et al. | 379/269 X |

FOREIGN PATENT DOCUMENTS 0088062 9/1983 European Pat. Off. .

Primary Examiner—Jin F. Ng
Assistant Examiner—Matthew E. Connors
Attorney, Agent, or Firm—Antonelli, Terry & Wands

[57] ABSTRACT

In a communication system, a modular expansion subsystem comprised of a plurality of general purpose slots disposed in the system cabinet, for receiving one or more co-operatively shaped interface modules connected to associated peripheral units, such as RS232C computer ports, answering machine interface circuits, local area network interface circuits, modems, etc. Additional slots are disposed in the cabinet for receiving one or more co-operatively shaped line or trunk interface modules connected to associated subscriber sets and outside telephone lines. A further slot is disposed in the cabinet for receiving a co-operatively shaped memory module in which an operating system program is stored. The various modules communicate with a central microprocessor of the communication system, which executes the stored operating system program, for identifying the various types of modules and the particular slots in which they are disposed. The modules can be easily installed by the user, without requiring the services of a trained technician, and the subsystem is entirely modular such that expansion is accommodated on a "pay as you go" basis.

25 Claims, 3 Drawing Sheets

EXPANSION SUBSYSTEM FOR USE IN A COMMUNICATION SYSTEM

This invention relates in general to communication systems, and more particularly to a modular expansion subsystem of a telephone system, for accommodating various expansion modules in a plurality of general purpose slots.

The feature of expandibility of modern telephone systems such as PABXs and key telephone systems, is becoming increasingly important in light of customer demands that initial expenditure for acquiring the systems be minimized, and that additional upgrading or expansion of the systems be on a "pay as you go" basis. Accordingly, it is a design objective of modern day communication system manufacturers to provide an inexpensive base system with a minimum of built-in expansion circuitry. In particular, it is preferred to defer as much of the cost of system expansion until such time as the user decides to upgrade or expand the base system.

A base system typically comprises a plurality of interface circuits for connection to local signal ports. For example, in a telephone system line and trunk circuits are utilized for interfacing subscriber sets and outside telephones with a local circuit switch, typically comprised of one or more crosspoint matrices. Interface circuits can also be utilized for connecting data terminals and computers, etc., to the circuit switch.

The interface circuits are typically in the form of printed circuit boards (PCBs) which are housed in predetermined slots disposed in the base system, for communication with a central controller and the circuit switch via a backplane. Edge connectors are disposed on the backplane for receiving and mating with the PCB card edges. Depending on the angle of insertion of individual card edges into the connectors, certain terminals may be connected before other ones of the terminals, giving rise to transient "illegal" voltage conditions on the interface circuit, such as reverse biased integrated circuits, etc. In the event that these transient conditions exceed the tolerance specifications of the circuit components, the components may become damaged.

Prior art systems are typically preconfigured to accommodate a predetermined number of specific types of interface circuits in predetermined associated slots, and can not easily be tailored to accommodate reconfiguration according customer specifications.

In order to reconfigure the base system to accommodate system expansion, the operating system program is typically required to be revised. In the event that the program is stored in one or more read only memory circuits, a skilled technician is required to replace the memory circuits. Alternatively, in the event the program is stored on a magnetic disk, such as a floppy disk, the system is typically required to be powered down in order to replace the system program floppy disk with a revised version thereof. Considerable care is required in handling the floppy disk and powering up the system after replacing the disk, in order to avoid inadvertent damage.

Since prior art interface circuits are usually in the form of printed circuit boards, great care is required in physical handling of the circuit boards in order to avoid damage thereto during installation or removal from the base system, in addition to the damage that can occur as a result of the aforementioned transient illegal voltage conditions.

According to the present invention, an expansion subsystem is provided in a communication system, and is comprised of a plurality of general purpose slots for receiving one or more modules. One of the slots is designed to receive a co-operatively shaped memory module, while the remaining slots are designed to receive either dual line or trunk interface circuits or general purpose peripheral interface circuits for connection to various associated expansion signal ports. The memory module stores an operating system program for reconfiguring the system to accommodate the expansion. Accordingly, system expansion can be accomplished by the user without the requirement of trained technical assistance.

The modules are preferably in the form of cartridges encapsulating, and thereby protecting printed circuit boards on which electronic components of the interface circuits are disposed. An edge of the printed circuit board extends from an opening in the cartridge.

According to a preferred embodiment, the card edge is shaped in a double tiered manner for ensuring proper mating sequencing of the edge and backplane connector of the slot, to eliminate illegal power conditions being applied to the components.

The memory module and one or more of the line or trunk and peripheral modules may be sold to the user in the form of an expansion kit designed to suit the user's specific needs, on a "pay as you go" basis.

Figure 2:
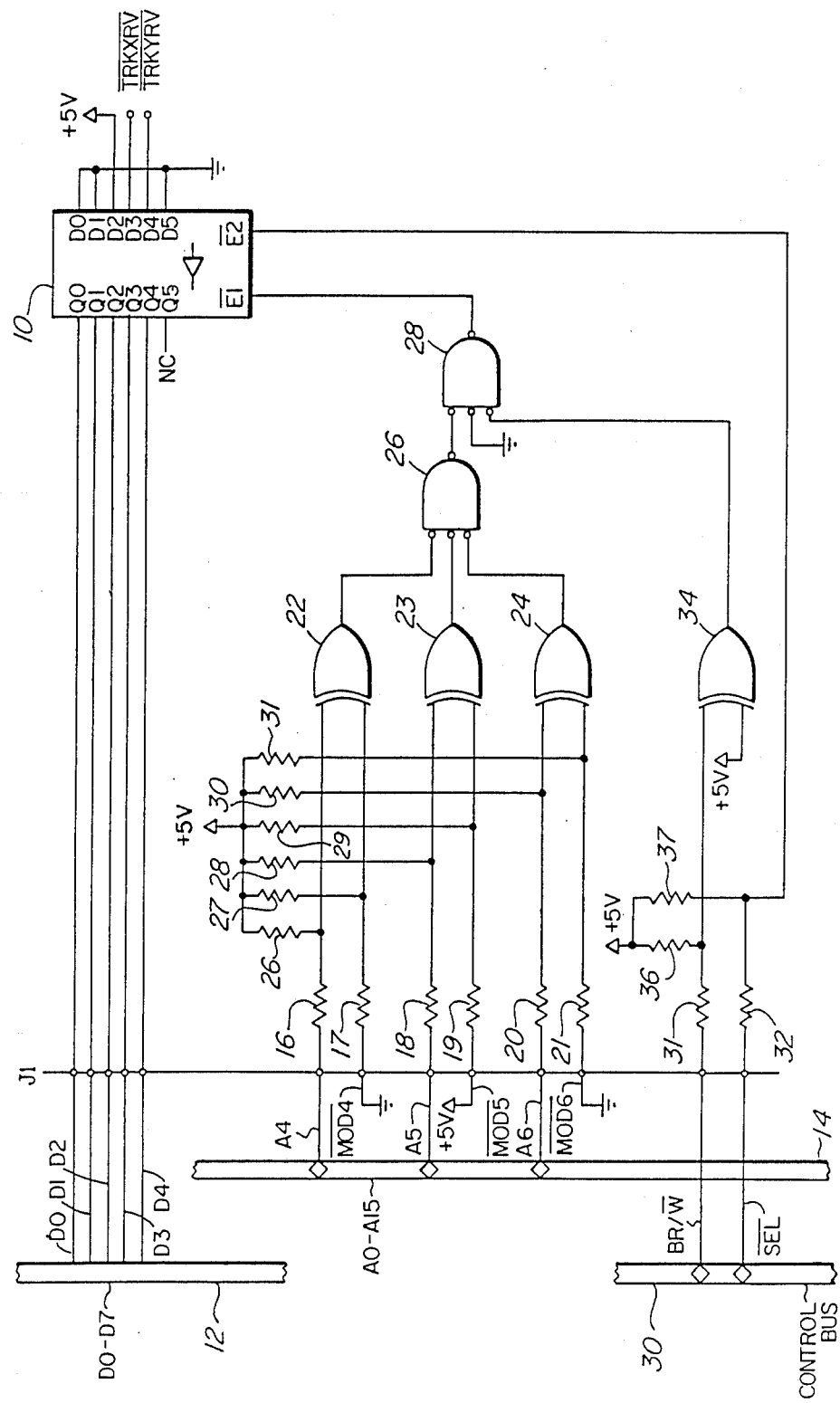
Figure 3:
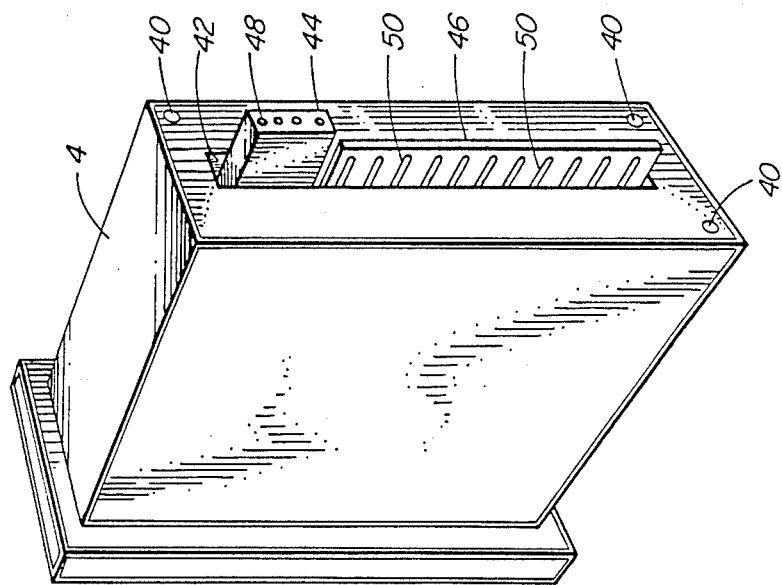

A better understanding of the invention will be obtained with reference to the detailed description below in conjunction with the following drawings, in which:

FIG. 1 is a perspective view of a communication system incorporating an expansion subsystem, according to the present invention, FIG. 2 is a schematic diagram showing interface circuitry of a module, according to a preferred embodiment of the present invention, and FIG. 3 is a perspective view of a module according to the preferred embodiment.

With reference to FIG. 1, a cabinet 1 is shown housing a communication system, such as a key telephone system. Disposed within the cabinet, but not shown, are a central controller such as microprocessor, a plurality of line and trunk interface circuits for connection to a plurality of local signal ports such as subscriber sets and outside telephone lines, via four-wire connectors 6, and a circuit switch for interconnecting various ones of the line and trunk interface circuits. The central controller, line and trunk interface circuits and circuit switch are all of well known design, and operate in accordance with well known principles which are not elucidated herein.

A plurality of slots shown generally as 2, are disposed in the cabinet 1 for receiving one or more modules, and a cover 7 is provided for protecting the modules and internal circuitry of the system during normal usage.

The leftmost slot has a co-operatively shaped memory module 3 disposed therein, and the rightmost two slots have dual line or trunk interface circuit modules 4 and 5 disposed therein. Additional four-wire connectors 6A are disposed on the modules 4 and 5 for connection to additional circuits such as subscriber sets or outside telephone lines.

As discussed above, the memory module 3 stores an operating system program for execution by the system microprocessor, in order to reconfigure the system to accommodate the additional expansion modules 4 and 5, and the circuits connected thereto.

The second slot from the left accommodates a co-operatively shaped tandem switching module for effecting communication between a plurality of communication systems via typically asynchronous digital signalling, such that the plural systems operate simultaneously and co-operatively, in tandem.

The adjacent three slots to the right of the tandem switching slot, accommodate co-operatively shaped general purpose modules for connection to general purpose expansion signal ports. The modules can be, for instance, answering machine interface circuits, local area network interface circuits, end-to-end signalling circuits, digital trunk interface circuits, centralized modems, application processors, personal computer interface circuits, SMDR interface circuits, automatic route selection interface circuits, busy lamp field interface circuits, call announce unit driver circuits, page announce amplifier circuits, or RS232C ports, etc. All of the aforementioned interface circuits are of standard well known design.

The remaining five slots accommodate co-operatively shaped dual line or trunk interface circuit modules, such as modules 4 and 5 for connection to additional associated expansion signal ports such as a subscriber set 8, or an outside telephone line.

Each of the four groups of slots (for accommodating the memory module, tandem switching module, general purpose modules and dual line or trunk modules), is keyed to accept only modules which are co-operatively shaped, as described in greater detail below with reference to FIG. 3. Hence, a memory module or tandem switching module can not inadvertently be inserted into one of the general purpose slots. Also, the slots and corresponding modules are preferably colour coded, using coloured labels 9, for example, in order to guide the user when connecting the modules to the appropriate slots.

With reference to FIG. 2, interface circuitry is shown for connecting a predetermined one of the modules via a backplane connector J1 to the central microprocessor (not shown) of the communication system.

A tristate bus driver 10 has D0, D1 and D5 inputs connected to ground, a D2 input connected to +5 volts, and the D3 and D4 inputs connected to sources of ringing voltage signal $\overline{TRKXRV}$ and $\overline{TRKYRV}$ respectively.

The Q0-Q4 outputs of driver 10 are connected via backplane connector J1, to a data bus 12 of the system microprocessor, and the Q5 output is not connected. Thus, in the event bus driver 10 is enabled via logic low signals being applied to the $\overline{E1}$ and $\overline{E2}$ terminals thereof, the signals appearing on the D0-D4 inputs of bus driver 10 are transmitted to the D0-D4 lines of the microprocessor data bus 12 via connector J1.

The D0-D2 inputs of bus driver 10 are hardwired to predetermined ones of the sources of ground and +5 volts, for providing a module identification data signal which is read by the system microprocessor in response to the bus driver 10 being enabled. In the example shown, the module identification data signal is of the form D0-D2=001.

The three bit data signal allows for the identification of up to eight different types of modules which can be disposed within a particular one of the corresponding slots. The ringing voltage signals applied to the D3 and D4 inputs of bus driver 10 are received by the system microprocessor and utilized to trigger ringing tones etc., in a well known manner.

The circuit shown in FIG. 2 can be disposed for instance, on one of the dual line or trunk circuits 4 or 5 shown in FIG. 1.

Because bus driver 10 is tristate, the Q0-Q4 outputs thereof exhibit a high impedance which does not load the data bus 12 in the event the driver is not enabled.

The memory module 3 typically includes decoding circuitry for defining a memory map which allocates blocks of memory identified with particular ones of the slots. Address lines A4-A6 of the microprocessor address bus 14, are allocated for identifying particular ones of the eight general purpose and dual line or trunk module slots 2, in FIG. 1.

Terminals $\overline{MOD\ 4}$, $\overline{MOD\ 5}$ and $\overline{MOD\ 6}$ on the connector J1 are hardwired to the sources of ground and 5 volts according to a predetermined exclusive combination identifying the particular one of the eight slots.

The A4-A6 and $\overline{MOD\ 4}$-$\overline{MOD\ 6}$ terminals of connector J1 are connected via input resistors 16-21 to respective inputs of EXCLUSIVE OR gates 22-24. Each of the inputs of EXCLUSIVE OR gates 22-24 are connected to a source of +5 volts via respective pull up resistors 26-31.

The outputs of EXCLUSIVE OR gates 22-24 are connected to three respective inputs of an OR gate 26 (shown configured as a negative input NAND gate). The output of OR gate 26 is connected to a first input of a further OR gate 28, a second input of which is connected to ground.

Control signals BR/$\overline{W}$ and $\overline{SEL}$ are generated by the system microprocessor and appear on a control bus 30 for application to corresponding terminals on backplane connector J1, in a well known manner. The respective terminals are connected via input resistors 31 and 32 to a first input of a further EXCLUSIVE OR gate 34 and to an enable input $\overline{E2}$ of bus driver 10, respectively.

Resistors 31 and 32 are also connected to a source of +5 volts through pull-up resistors 36 and 37 respectively.

The second input of EXCLUSIVE OR gate 34 is connected to a source of +5 volts, and the output of EXCLUSIVE OR gate 34 is connected to the third input of OR gate 28. The output of OR gate 28 is, in turn, connected an enable input $\overline{E1}$ of the bus driver 10.

In operation, the system microprocessor polls the rightmost eight slots 2 by generating signals on the A4-A6 lines of address bus 14 for application to the corresponding terminals of connector J1. The generated address signals are compared in EXCLUSIVE OR gates 22-24 with the hardwired logic level signals applied to the $\overline{MOD\ 4}$-$\overline{MOD\ 6}$ terminals. Respective ones of the OR gates 22-24 generate logic high output signals in the event the signals applied to the inputs thereof are different, and logic low level signals are generated in the event they are the same.

Thus, for the hardwired configuration shown in FIG. 2, an address signal having value 010 appearing on address lines A4-A6 results in each of the EXCLUSIVE OR gates 22-24 generating a logic low level signal. Any other combination appearing on the address lines A4-A6 results in a logic high level signal being generated by at least one of the EXCLUSIVE OR gates 22-24.

In response to the outputs of EXCLUSIVE OR gates 22-24 generating logic low level signals, the output of OR gate 26 also generates a logic low level signal.

The system microprocessor then generates a logic low level control signal $\overline{SEL}$ for application via connector J1 and resistor 32 to the $\overline{E2}$ input of bus driver 10. Also, the microprocessor generates a logic high level read control signal BR/$\overline{W}$ for application to the first input of EXCLUSIVE OR gate 34, causing the output thereof to generate a logic low level signal. The logic low level signals from OR gate 26 and EXCLUSIVE OR gate 34 are applied to the first and third inputs of OR gate 28, (the second input thereof being connected to ground), such that the output of OR gate 28 generates a logic low level signal for application to the $\overline{E1}$ enable input of bus driver 10. In response, the data applied to the D0–D4 inputs thereof is transmitted via connector J1 to the data bus 12 of the system microprocessor, and read therefrom.

In the event of any other combination of address signals carried by lines A4–A6, or in the event of a logic low level control signal on the BR/$\overline{W}$ line of control bus 30, or a logic high level $\overline{SEL}$ signal, the bus driver 10 is not enabled, and the three bit identification data signal is not transmitted to data bus 12.

According to the successful prototype, the $\overline{SEL}$ signal corresponds to the decoded address of the signals appearing on the A15–A7 lines of address bus 14.

Thus, in response to polling a particular one of the slots, the microprocessor reads the module identification data signal applied to the D0–D2 inputs of driver 10 and determines therefrom the type, or identity of the module connected to the particular slot. The microprocessor then executes appropriate routines of the operating system program for accommodating the identified module in the particular slot.

In this way, the communication system effectively reconfigures itself automatically upon insertion of an expansion module into one of the slots 2, without requiring modification of the operating system program or installation of expensive expansion port circuitry.

In addition, address lines A0–A3 may be utilized for addressing up to sixteen individual registers associated with a connected one of the modules for reading or writing data thereto.

In the event no module is present in the polled one of the slots, the microprocessor detects high impedance levels on the D0–D2 data lines in response to no devices being connected to the corresponding terminals of connector J1. The microprocessor interprets the high impedance levels as indicating absence of a module from the addressed slot.

In addition to the interface circuitry discussed with reference to FIG. 2, additional well known signal transmission circuitry (e.g., hybrid circuits, RS232 drivers, DTMF tone generators, audio amplifiers, etc.,) are typically included in the respective modules for implementing the specific peripheral interface functions associated therewith. Similarly, the connector J1 typically includes a plurality of additional terminals for connection to the signal transmission circuits.

With reference to FIG. 3, a perspective view of a module is illustrated, according to the preferred embodiment of the present invention.

The module, such as module 4 shown in FIG. 1, has a plurality of holes 40 disposed in the rear surface thereof for mating with co-operating keys (not shown) disposed in corresponding rear surfaces of the slots 2 (FIG. 1) such that only modules with holes 40 disposed in the identical location to the keys in the slots 2, are accommodated within the slots. This effectively prevents, for example, an unskilled user from inserting a dual line or trunk module, such as module 4, in the leftmost slot 2, normally utilized for accommodating a co-operatively shaped memory module.

The cartridge encapsulates a printed circuit board housing various electronic components (such as, inter alia, the components illustrated in FIG. 2), and a card edge of the printed circuit board extends from an opening 42 in the rear surface of the module, for connection to a corresponding connector (J1) disposed in the rear surface of the co-operating one of the slots 2.

The card edge is preferably two-tiered having a first connector 44 extending beyond a second connector 46. The connector 44 includes sockets 48 for receiving corresponding pins of the connector J1 for interconnecting the ground rails and precharge rails of the system backplane and the corresponding module.

It has been found that included in the aforementioned components housed on the printed circuit boards, are a plurality of capacitors which are charged through a plurality of corresponding resistors. It is desirable to avoid generating a large transient current on the system power rails as a result of rapid charging of these capacitors. Accordingly, the circuit board capacitors are charged via the aforementioned ground and precharge sockets 48 prior to power being applied to the remainder of the printed circuit board.

The remaining connector 46 has a plurality of gold fingers 50 connected to signal tracks, data lines, and power rails of the printed circuit, in a well known manner. The fingers 50 interconnect with corresponding terminals of the connector (J1).

Thus, in operation, the module 4 is inserted into one of the slots 2 having a corresponding color coded label 9, as discussed above with reference to FIG. 1. Because the key holes 40 correspond with keys projecting from the rear surface of the selected one of the slots 2, the module can be further inserted by hand such that the first connector 44 of the card edge mates with corresponding pins of the backplane connector J1 for precharging capacitors on the printed circuit board, and thereafter the second connector 46 mates with the remaining terminals of the connector J1.

In summary, according to the present invention, modules may be inserted and removed in a straightforward manner without requiring the assistance of a qualified technician. The modules are housed in protective cartridges, similar in shape to video game cartridges, in order to prevent inadvertent damage when being handled, and the connection between the module card edges and backplane connectors is sequenced as a result of the two-tiered design of the card edge, thereby preventing the occurrence of damaging illegal circuit conditions.

According to the present invention, an "open architecture" approach to system expansion is accommodated. Thus, individual users can customize their respective systems by simply specifying the particular expansion modules required, selecting the number of additional line or trunk circuits desired, and selecting an appropriate memory module for configuring the system to accommodate the selected modules. Hence, doctors, lawyers, dentists or retail outlets can select specific modules to suit their particular needs.

A person understanding the present invention may conceive of other embodiments or variations thereof. For instance, while the keys and holes have been described herein as being in the shape of holes and correspondingly shaped keys, they can be alternatively in the form of runners embossed on the cartridge and correspondingly grooves disposed in the slots. Also, while the preferred embodiment described herein refers to a telephone system, such as a key telephone system or PABX, the principles of the present invention may be applied to other communication systems such as for example data switching systems or PACXs.

All such embodiments and variations are believed to be within the sphere and scope of the invention as defined in the claims appended hereto.

I claim:

1. In a communication system housed in a cabinet, including a central controller for executing an operating system program for communicating with a predetermined number of local signal ports, a modular expansion subsystem comprised of:
    (a) a plurality of slots disposed in said cabinet, each including connector means connected to said central controller,
    (b) a plurality of modules for connection to respective expansion signal ports, each of said modules including circuitry for interfacing said respective expansion signal ports with said central controller via eaid connector means, said modules being of predetermined shape for insertion into cooperatively shaped ones of said slots,
    (c) additional circuitry within respective ones of said modules for generating respective identification data signals representative of said respective ones of said modules in response to said respective ones of said modules being inserted in said cooperatively shaped slots, and
    (d) means in said central controller for receiving said identification signals and in responses executing predetermined routines of said operating system program for communicating with said respective expansion signal ports via said respective modules and said connector means, whereby said communication system is reconfigured to accommodate said expansion signal ports in addition to said predetermined number of local signal ports.

2. A modular expansion subsystem as defined in claim 1, wherein at least one of said modules is a memory module for storing said operating system program.

3. A modular expansion subsystem as defined in claim 1, wherein one or more of said modules connected to a plurality of associated modules are comprised of dual line or trunk interface subscriber sets or outside telephone lines, respectively.

4. A modular expansion subsystem as defined in claim 1, wherein at least one of said modules is comprised of an RS-232C port.

5. A modular expansion subsystem as defined in claim 1, wherein at least one of said modules is comprised of an answering machine interface circuit.

6. A modular expansion subsystem as defined in claim 1, wherein at least one of said modules is comprised of a local area network interface circuit.

7. A modular expansion subsystem as defined in claim 1, wherein at least one of said modules is comprised of an end-to-end signalling circuit.

8. A modular expansion subsystem as defined in claim 1, wherein at least one of said modules is comprised of a digital trunk interface circuit.

9. A modular expansion subsystem as defined in claim 1, wherein at least one of said modules is comprised of a centralized modem.

10. A modular expansion subsystem as defined in claim 1, wherein at least one of said modules is comprised of an applications processor.

11. A modular expansion subsystem as defined in claim 1, wherein at least one of said modules is comprised of a personal computer interface circuit.

12. A modular expansion subsystem as defined in claim 1, wherein at least one of said modules is comprised of an SMDR interface circuit.

13. A modular expansion subsystem as defined in claim 1, wherein at least one of said modules is comprised of an automatic route selection circuit.

14. A modular expansion subsystem as defined in claim 1, wherein at least one of said modules is comprised of a busy lamp field interface circuit.

15. A modular expansion subsystem as defined in claim 1, wherein at least one of said modules is comprised of a call announce unit driver circuit.

16. A modular expansion subsystem as defined in claim 1, wherein at least one of said modules is comprised of a page announce amplifier circuit.

17. A modular expansion subsystem as defined in claim 1, wherein said modules are comprised of encapsulated cartridges.

18. A modular expansion subsystem as defined in claim 1, further including means for interconnecting said modules and connector means according to a predetermined sequence, such that ground terminals and precharge rails of the modules are connected to corresponding rails of the connector means firstly, followed by connection of corresponding power rails and signal carrying leads.

19. A modular expansion subsystem as defined in claim 1, wherein said modules are in the form of easily manipulable protective cartridges.

20. A modular expansion subsystem as defined in claim 1, wherein each of said slots and associated modules further include key means for preventing inadvertent insertion of incompatible ones of said modules into said slots.

21. A modular expansion subsystem as defined in claim 1, wherein said modules are comprised of encapsulated cartridges having card edges projecting therefrom for mating with associated backplane card edge connectors disposed in said slots.

22. A modular expansion subsystem as defined in claim 1, wherein said modules are comprised of encapsulated cartridges having card edges projecting therefrom for mating with associated backplane card edge connectors disposed in said slots, and wherein each card edge is two-tiered, thereby effecting a two stage connection of the associated card edge and card edge connector.

23. A modular expansion subsystem as defined in claim 1, further including colored labels affixed to each of said modules and slots for indicating which of said modules are insertible within said co-operatively shaped ones of said slots.

24. A modular expansion subsystem as defined in claim 1, wherein:
    (a) said central controller is comprised of a microprocessor for generating predetermined sample address signals associated with respective ones of said slots,
    (b) circuitry is provided in said slots for generating predetermined slot address signals, receiving and comparing said sample address signals and slot address signals, and in the event said sample address signals and slot address signals are equal generating respective enable signals, and (c) said additional circuitry within respective ones of said modules receives said enable signals in response to said respective ones of said modules being inserted into said cooperatively shaped slots, and generates said identification data signals in response to receiving said enable signals.

25. In a communication system having a central controller housed in a cabinet, and including a plurality of slots for receiving cooperatively shaped modules, a method for identifying said modules in response to insertion of said modules into said slots, comprising the steps of:

(a) generating from said central controller, predetermined sample address signals for polling with respective ones of said slots,
(b) generating from said slots respective predetermined slot address signals,
(c) receiving and comparing said predetermined address signals and slot address signals,
(d) generating respective enable signals in the event said sample address signals and slot address signals are equal, and
(e) receiving said enable signals and in response generating from said modules and transmitting to said central controller via said slots, predetermined identification data signals for identifying said modules.

* * * * *